Patented Jan. 25, 1927.

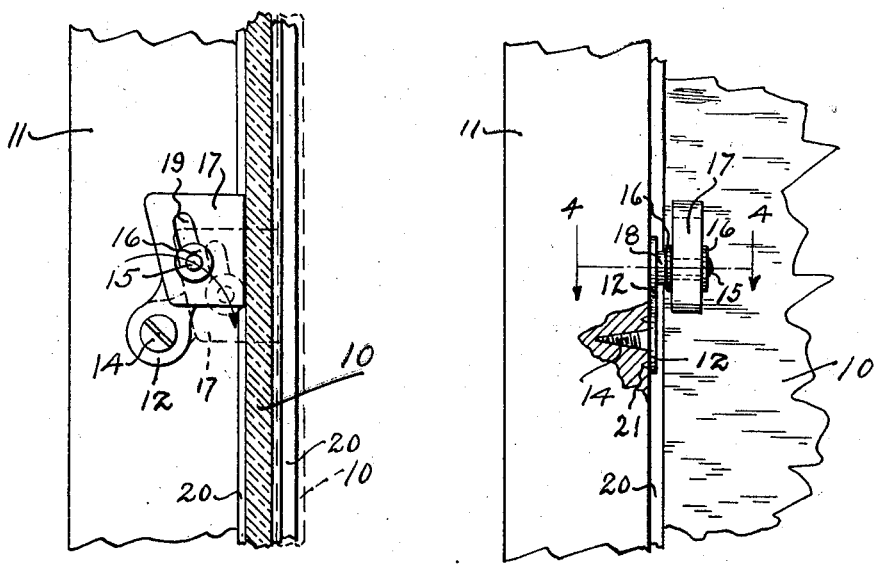

1,615,554

UNITED STATES PATENT OFFICE.

ROBERT C. PISCATOR, OF INDIANAPOLIS, INDIANA, ASSIGNOR TO QUALITY PLATING AND MANUFACTURING COMPANY, A CORPORATION OF INDIANA.

ADJUSTABLE WINDOW STOP.

Application filed March 1, 1926. Serial No. 91,317.

This invention relates to adjustable means for retaining a window at any desired elevation, such means comprising essentially, a rubber cam adapted to bear directly against the glass of the window and be directed toward the glass by a supporting post capable of being adjustably positioned at some point on the frame work in which the window slides, and one particular embodiment of the invention is here described in reference to the accompanying drawing, in which—

Fig. 1 is a side elevation of the window stop;

Fig. 2, a rear elevation of the stop;

Fig. 3, a side elevation of the window stop, being the reverse of that in Fig. 1; and Fig. 4, a transverse section through the stop on the line 4—4 in Fig. 2.

Like characters of reference indicate like parts throughout the several views.

Referring first particularly to Figs. 1 and 2, a fragment of the window glass 10, and of the window frame post 11 are shown to indicate the positions relative to the window stop, and the window stop is composed of a plate 12 having a hole 13 through one end through which the attaching screw 14 is passed into the frame post 11.

The other end of the plate 12 carries a post 15 projecting outwardly from the frame post 11 and extends through and slidably carries thereon between the washers 16 the rubber cam 17. A spacer 18 carried on the post 15 holds the cam 17 at a substantial distance from the plate 12.

The cam 17 is made entirely of rubber and has a slot 19 formed therein spaced back from the cam face adapted to contact the glass 10, the slot being inclined upwardly and backwardly with respect to the contacting face, and it is through this slot 19 that the post 15 passes. Referring to Fig. 3, the cam 17 is operated by sliding it upwardly and downwardly on the post 15, whereby the contacting face is retained in substantially a series of vertical parallel planes, and a component horizontal travel is effected as indicated between the solid and dash-line positions of the cam 17. A slight pressure on top of the cam 17, Fig. 1, will wedge the cam 17 between the post 15 and the glass 10, and by reason of the soft yielding body of the cam 17, the cam 17 will there remain, as the body of the cam 17 will be depressed about the post 15 to form a cup-like depression therearound, and the more the glass 10 tends to drop, the tighter the cam 17 will grip the glass 10.

Since it is difficult to exactly locate the support of the cam 17 to provide the correct horizontal travel of the cam 17 in relation to the glass 10, the plate 12 is formed as above described with the single mounting screw 14, so that the plate 12 may be swung about the screw 14 as a center to carry the cam 17 toward or away from the glass 10 as may be required. Referring to Fig. 1, the solid lines indicate one possible position of the stop and glass, while the dash lines indicate the plate 12 and cam 17 swung down to meet the glass 10 in the dash-line position to the right of the solid-line position.

In some cases the glass 10, as in an automobile door or window is carried in a narrow frame 20, and the spacer 18 is provided to space the cam 17 from the plate 12 so as to permit the cam 17 to contact the glass 10 beyond the frame 20.

When the desired position of the plate 12 is obtained by swinging it around the screw 14, by trial, the screw 14 is tightened up against the plate, and the detents 21 projecting from the plate 12 are so caused to grip against the frame post 11 to prevent further turning about the screw 14. Other means, such as a second screw or a single detent between the screw 14 and the post 15, may be employed to cause the plate 12 to remain fixed in position.

I claim:

1. A window stop comprising a mounting plate adapted to be pivotally attached by one end to the frame of a window, a post carried by the other end, an elastic-bodied cam having a face adapted to contact the glass of the window and said cam having a slot therethrough inclined upwardly and backwardly in reference to the contacting face, said post projecting through said slot, and means slidably retaining said cam on said post.

2. A window stop comprising a mounting plate having a point about which the plate may be pivotally swung, and a rubber cam slidably carried by the plate whereby a vertical force applied to the cam results in a component vertical and horizontal travel of the cam.

3. A window stop comprising a mounting plate having a point about which the plate may be pivotally swung, and a rubber cam slidably carried by the plate whereby a vertical force applied to the cam results in a component vertical and horizontal travel of the cam and means of preventing swinging of the plate about said point.

In testimony whereof I affix my signature.

ROBERT C. PISCATOR.